United States Patent
Mutalik et al.

(10) Patent No.: US 9,419,408 B2
(45) Date of Patent: Aug. 16, 2016

(54) OPTICAL AMPLIFIER WITH SELF-ADJUSTING GAIN BASED ON REFLECTED FEEDBACK

(71) Applicant: ARRIS Enterprises, Inc., Suwanee, GA (US)

(72) Inventors: Venkatesh G. Mutalik, Middletown, CT (US); Kevin Orazietti, Chester, CT (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 14/142,725

(22) Filed: Dec. 27, 2013

(65) Prior Publication Data

US 2015/0188287 A1    Jul. 2, 2015

(51) Int. Cl.
   *H01S 3/30*      (2006.01)
   *H04B 10/29*     (2013.01)
   *H01S 3/067*     (2006.01)
   *H04B 10/293*    (2013.01)

(52) U.S. Cl.
   CPC .............. *H01S 3/30* (2013.01); *H04B 10/2931* (2013.01); *H01S 3/06754* (2013.01)

(58) Field of Classification Search
   CPC .............. H04J 14/0272; H01S 3/06754; H01S 3/06766; H01S 3/302; H04B 10/2931
   See application file for complete search history.

(56) References Cited

U.S. PATENT DOCUMENTS

| | | | |
|---|---|---|---|
| 5,764,359 A * | 6/1998 | Lyu et al. | 356/477 |
| 7,692,849 B2 * | 4/2010 | Shukunami et al. | 359/334 |
| 8,259,387 B2 * | 9/2012 | Campanelli et al. | 359/333 |
| 2003/0090757 A1 * | 5/2003 | Ohtani | 359/111 |
| 2005/0105165 A1 | 5/2005 | Emori et al. | |
| 2008/0013162 A1 * | 1/2008 | Shukunami et al. | 359/334 |
| 2008/0144987 A1 * | 6/2008 | Tanaka | 385/1 |
| 2010/0110535 A1 * | 5/2010 | Murison et al. | 359/341.3 |
| 2010/0178052 A1 * | 7/2010 | Eggleton et al. | 398/26 |
| 2013/0045003 A1 * | 2/2013 | Mutalik et al. | 398/25 |

FOREIGN PATENT DOCUMENTS

EP   0847152 A2   6/1998

OTHER PUBLICATIONS

PCT Search Report & Written Opinion, RE: Application No. PCT/US2014/068771, dated Apr. 8, 2015.

* cited by examiner

*Primary Examiner* — Eric Bolda
(74) *Attorney, Agent, or Firm* — Lori Anne D. Swanson

(57) ABSTRACT

An optical amplifier with network optimization techniques maximizes performance of a conventional optical amplifier with minimum user intervention. A circulator enables as much light as possible just below a stimulated Brillouin scattering threshold to be launched in to an optical fiber. An amount of reflected power directed by a circulator to a photo diode has a direct correlation to the quality of the received signal in a communications system.

20 Claims, 5 Drawing Sheets

OPTICAL AMPLIFIER WITH SELF-ADJUSTING GAIN BASED ON REFLECTED FEEDBACK

BACKGROUND

Optical communications systems utilize pulses of light, i.e., optical signals, through light channels or fiber optic cables to transmit information between devices. If the optical power input to a fiber in the optical communication system is too high, a phenomenon known as Stimulated Brillouin Scattering (SBS) may occur. With SBS, a portion of the light input to the fiber is reflected and the power level of the light transmitted through the fiber is reduced below the intended input power level, among other deleterious effects. SBS can reduce the quality of the signal output from the fiber and thereby affect the performance of a communication system.

Currently there is no solution that optimizes a fiber link by mitigating SBS without requiring extensive knowledge of optical communications systems, often requiring personnel at both transmitter and receiver sites. Current attempts to mitigate the effects of SBS include using phase modulation, increasing the linewidth of the source, and limiting the power per channel to less than the SBS threshold.

Desirable are manners for minimizing setup time of an optical communication system and providing optimization specific to the effects of SBS in the network with minimal user intervention.

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings.

It is noted that while the accompanying FIGS. serve to illustrate embodiments of concepts that include the claimed invention, and explain various principles and advantages of those embodiments, the concepts displayed are not necessary to understand the embodiments of the present invention, as the details depicted in the FIGS. would be readily apparent to those of ordinary skill in the art having the benefit of the description herein.

DETAILED DESCRIPTION

Disclosed herein are techniques for adaptive network optimization to automatically adjust gain in an optical amplifier, including techniques for suppressing stimulated Brillouin scattering (SBS) in an optical transmitter. The techniques may desirably improve performance in an optical transmitter system with minimal user intervention.

In an optical communication system, information is transmitted via message signals through a physical medium from a source to a destination. For example, a cable-based system can be used to deliver analog and/or high-definition digital entertainment and telecommunications such as video, voice, and high-speed Internet services from a headend to subscribers over an existing cable television network. The cable television network can take the form of an all-coax, all-fiber, or hybrid fiber/coax (HFC) network. In an HFC network, for example, an optical transmitter in the headend/hub converts the electrical signals (e.g., data, video, and voice signals) to optical signals. The optical signals are transmitted downstream via a fiber to a fiber node that serves a group of end users (i.e., a service group). The fiber node can include an optical receiver that converts the received optical signals to electrical signals that then are transmitted to the service group, for example, via receiving devices such as cable modems (CMs) and/or set top boxes (STBs).

Figure 1:
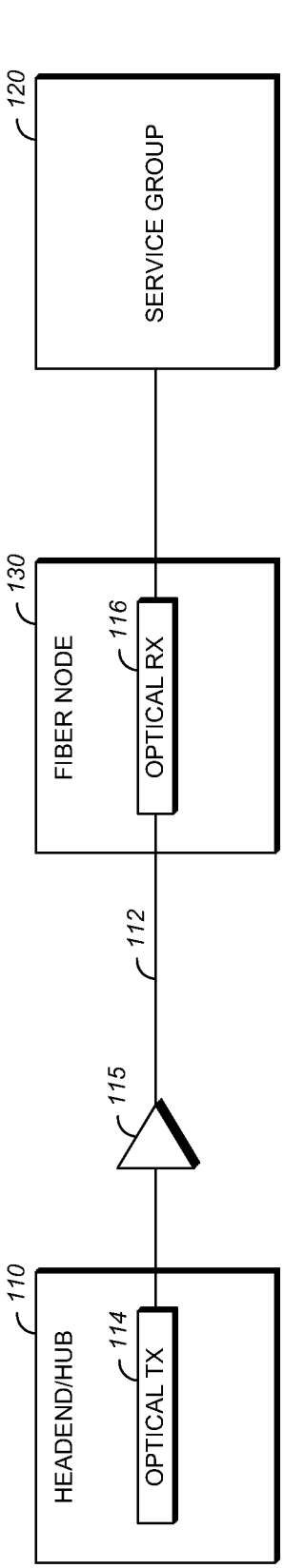
FIG. 1 illustrates an example optical communication system operable to deliver analog and/or high-definition digital entertainment and telecommunications.

FIG. 1 illustrates an example optical communication system 100 operable to deliver analog and/or high-definition digital entertainment and telecommunications such as video, voice, and high-speed Internet services over a fiber 112 between a headend/hub 110 and fiber node 130 for delivery to a service group 120 of receiving devices such as cable modems (CMs) and/or set top boxes (STBs). EDFA 115 is shown between headend/hub 110 and the fiber node 130, but it is noted that the EDFA 115 may be located in the headend/hub 110 and/or in the fiber node 130. An optical transmitter 114 in the headend/hub 110 converts electrical signals representing various services (e.g., video, voice, and Internet) to optical signals for transmission over the fiber 112 to the fiber node 130. The optical signal from the transmitter 114 may be amplified by an amplifier 115 (e.g., an erbium doped fiber amplifier (EDFA)) before reaching the fiber node 130. The fiber node 130 includes an optical receiver 116 that converts the received optical signals to electrical signals. The optical receiver 115 can be a standard optical receiver such as the optical receiver 116 in the fiber node 130. The electrical signals then are transmitted to service group 120.

Brillouin scattering is a phenomenon that occurs when light in a medium (e.g., air, water, crystal) interacts with time-dependent optical density variations and changes its energy (frequency) and path. For intense beams (e.g., laser light) traveling in a medium such as optical fiber 112 in an optical communications system, the variations in the electric field of the beam itself may produce acoustic vibrations in the medium. For example, an incident wave propagates from the headend 110 to a fiber node 130 along the optical fiber 112 shown in FIG. 1. When large amounts of light are launched in to the optical fiber 112 by the optical transmitter at 114, the incident wave entering the optical amplifier 115 may exceed a threshold power, exciting an acoustic wave within the fiber 112. A resulting fluctuation in the refractive index from the acoustic wave creates a reflected wave that propagates in a direction opposite to the incident wave. The incident beam undergoes Brillouin scattering from the vibrations, a phenomenon known as stimulated Brillouin scattering (SBS). Brillouin scattering may also reduce the quality of the signal received at the fiber node 130 and thereby degrade the performance of the optical communications system 100.

As discussed above, current manners for mitigating the effects of SBS include using phase modulation, increasing the linewidth of the source, and limiting the power per channel to less than the SBS threshold. Using phase modulation may add significant cost and also may not be practical based on the transport technology used, and increasing the lindewidth of the source may result in significant dispersion penalty. Ensuring the power per channel is less than the SBS threshold may not be applicable to long haul networks without a reduction in amplifier spacing, thus adding cost. In an example, a wavelength of light is divided in to multiple smaller wavelengths, each less than a Brillouin scattering threshold, for inputting to the optical fiber. If two wavelengths less than a 7 dBm Brillouin threshold are input in to the optical fiber, the SBS limit of that transmitter is effectively increased by 3 db. However, the extension of the SBS limit achieved by such attempts has been limited, whereby current approaches have been unable to extend the limit past 16-18 dbm for nominal links.

In applications, such as radio frequency over glass (RFoG) applications, it may desirable to successfully launch more light in to the optical communications system than is achievable by currently available techniques. It is desirable to mitigate the amount of SBS in an optical fiber, maximize the use of light, and/or identify how much light an optical fiber can manage. In particular, it is desirable to know how much light the optical fiber can handle before experiencing the backscatter.

A conventional optical communications system relies on an estimate of a Brillouin threshold value to determine how much light to input. However, existing systems lack a manner for determining a priori the length and type of the fiber to properly specify the Brillouin threshold. Therefore, an estimate of the length and type of fiber is used to control how much light is launched in to the optical fiber. If the estimate is high and too much light is launched, the resulting backscatter may destroy distortion, destroy carrier lines, and/or cause a loss of performance. Accordingly, the Brillouin threshold is typically estimated at a conservative limit based on the estimate of the length and/or type of the fiber, so as to reduce SBS. However, if the estimate is low and too little light is launched, the optical fiber is underutilized and experiences a loss of its potential performance, e.g., the carrier to noise ratio may suffer. Thus, the current techniques for estimating the Brillouin threshold tend to underutilize and reduce the performance of the optical fiber.

Referring to the example optical communication system 100 of FIG. 1, disclosed herein are modifications to a conventional optical amplifier 115 for providing more efficient uses of the optical fiber. As shown in FIG. 1, the output of the optical transmitter 114 may be connected to an optical amplifier 115. An optical amplifier is a device that amplifies an optical signal directly, without the need to first convert the signal to an electrical signal. A doped fiber amplifier (DFAs) is an example optical amplifier that uses a doped optical fiber as a gain medium to amplify an optical signal. The signal input to be amplified and a pump laser are multiplexed into the doped fiber and the signal is amplified through interaction with the doping ions.

Stimulated Brillouin scattering is frequently encountered when narrow-band optical signals (e.g., from a single-frequency laser) are amplified in an optical amplifier. It is well known that the amount of light, or the available power, that can be injected into a single-mode fiber is limited by SBS. With SBS, instead of light going in to the fiber, light is reflected back along the input path. The SBS can be thought of as a result of an overflow of light in to the optical fiber. Therefore, it is important to accommodate for the SBS threshold when designing an optical transmission system.

Figure 2:
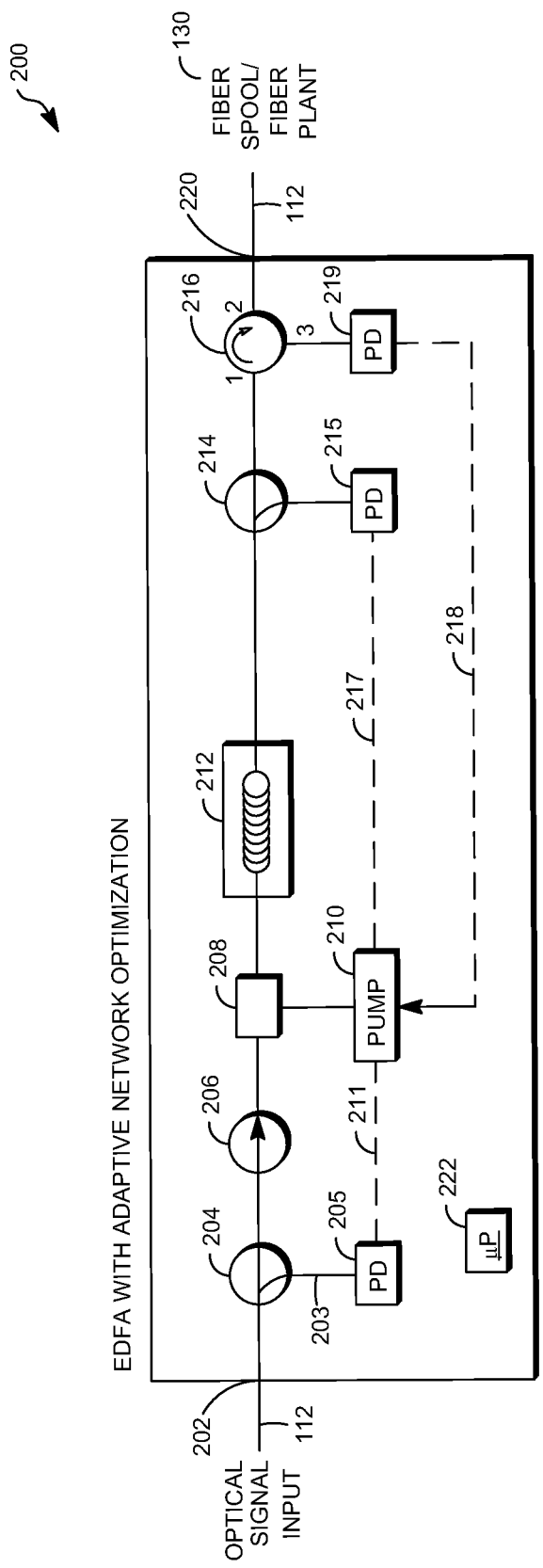
FIG. 2 depicts an embodiment of an erbium doped fiber amplifier (EDFA).
Figure 3:
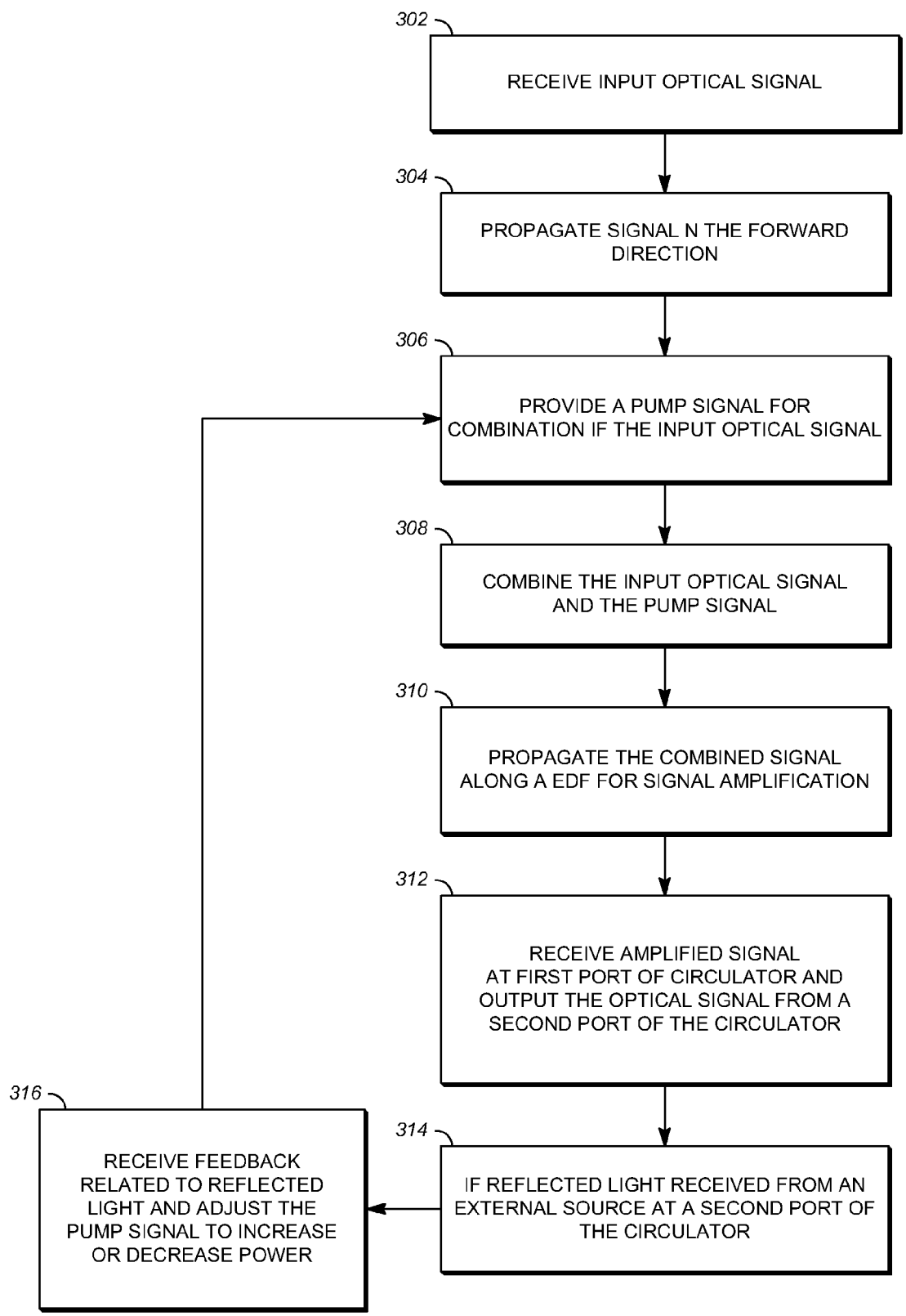
FIG. 3 depicts a flow diagram of a method for employing the disclosed adaptive network optimization techniques in an EDFA.
Figure 4:
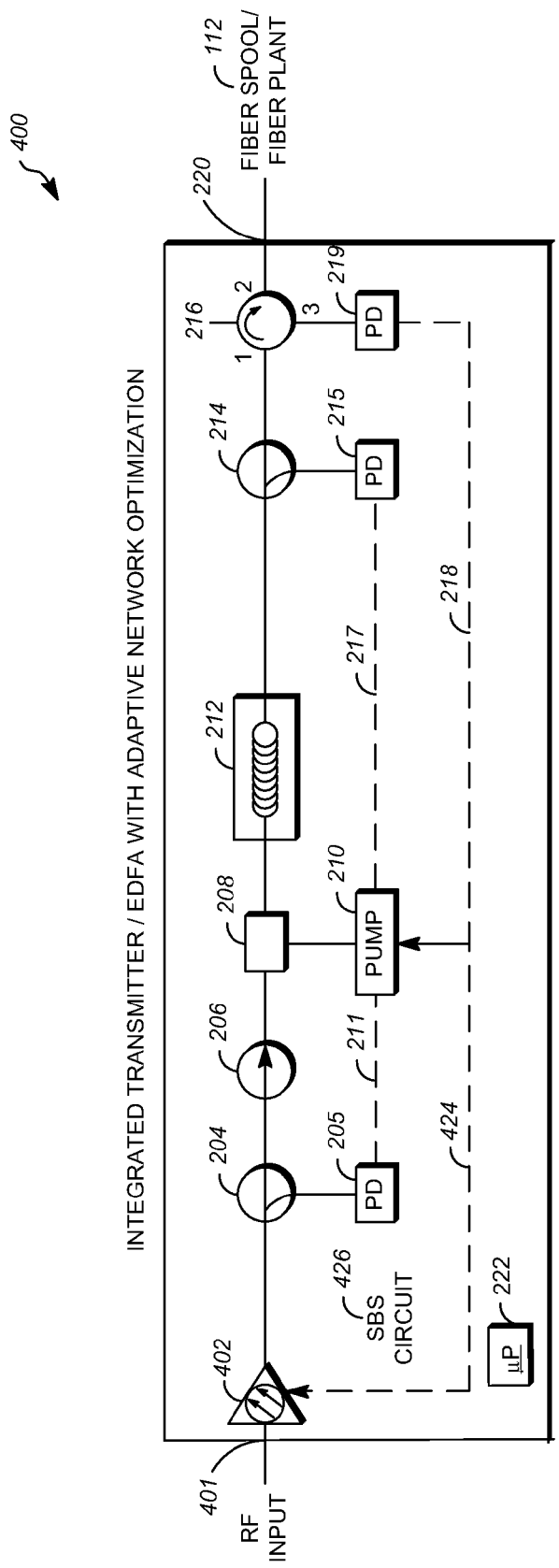
FIG. 4 depicts another embodiment of the EDFA depicted in FIG. 2.

FIGS. 2-4 illustrate modifications to the optical amplifier 115 to more efficiently adjust for an SBS limit of the fiber. As described below, a modified EDFA employs adaptive network optimization techniques that may adjust the optical amplifier gain and thus suppress SBS in an optical link. The premise of EDFA technology is the erbium doped fiber (EDF), which is a silica fiber doped with erbium. Conventionally, an EDFA includes a length of EDF, a pump, and a component for combining the signal and pump wavelength so they can propagate simultaneously through the EDF. As described in more detail below, when a pump wavelength and signal wavelength are simultaneously propagating through an EDF, energy transfer will occur via the Erbium from the pump wavelength to the signal wavelength, resulting in signal amplification. The pump energy is typically 980 nm pump energy, 1480 nm pump energy, or a combination of both. The result of the signal passing through the EDF is a very low noise amplification of light. The amplified output signal can be carried over the fiber 112 to the fiber plant or fiber node 130. Thus, the EDFA is effectively a high gain amplifier. The total gain of the EDFA may be determined by subtracting the input optical level from the output optical level.

The disclosed adaptive network optimization techniques may maximize performance of a conventional EDFA with minimum user intervention. In embodiments, the modifications to the EDFA include the use of a circulator to enable as much light as possible just below a stimulated Brillouin scattering threshold to be launched in to the optical fiber 112. The disclosed techniques capitalize on the findings that an amount of reflected power directed by a circulator to a photo diode has a direct correlation to the quality of the received signal in a communications system.

FIG. 2 depicts an embodiment of an erbium doped fiber amplifier (EDFA) 200 and FIG. 3 depicts a flow diagram of a method for employing the disclosed adaptive network optimization techniques in an EDFA. FIGS. 2 and 3 illustrate the modifications made to a conventional EDFA to create a more efficient optical amplifier 115. As shown in FIG. 2, EDFA 200 includes a wavelength division multiplexer (WDM) 208, pump 210, and EDF fiber spool 212. Besides the three basic components, additional optical and electronic components may be used in a basic single stage EDFA, such as photodiodes, isolators, and microprocessors.

As shown in FIG. 3, at 302, an input optical signal is received. FIG. 2 depicts an optical signal over fiber 112 entering the EDFA 200 from the left at input port 202. The input port is, for example, an optical connector or the like configured to receive an input optical signal. The optical signal having a wavelength, e.g., 1550 nm, may be input thereto. A coupler or splitter 204 splits off a part of the optical signal input at port 202 and inputs the split-off portion at 203 into an optical detector, such as photodiode 205. For purposes of example, the optical detectors are depicted as photodiodes. The split-off portion is a small percentage, e.g., typically 1-2%, e.g., $\frac{1}{10}^{th}$ of a milliwatt, of the signal power of the optical signal input to the EDFA 200. The photodiode 205 confirms that a signal is present and also estimates how much signal makes up the input signal. For example, the photodiode 205 may convert the optical signal into a corresponding electrical signal to detect a light intensity of the input signal. If no light or very low light is received by the photodiode 205, the EDFA may thus also be shut down.

At 304, the input signal is propagated in the forward direction. As shown in FIG. 2, the input signal passes from the coupler 204 to isolator 206, before being combined at 208 with pump energy emitted by the pump laser diode 210. An isolator enables the optical signal to propagate in only one direction and functions to prevent light from getting back into the transmitter (i.e., the isolator functions as a preventer of reflection). As discussed above, stray reflections of light can be detrimental to the performance of an optical communications system. The isolator 206 blocks light returning from the pump 210 and EDF 212, for example. Thus, the isolator 206 functions to prevent degradation of amplification efficiency which may result from the propagating of the light amplified in the EDF or a spontaneously emitted light in the reverse direction.

At 306, the pump 210 provides a beam of light to the WDM 208 that may be high-powered relative to the input signal. At 308, a combiner combines the input signal and pump signal. FIG. 2 depicts a WDM 208 as the combiner that combines the input signal and pump wavelengths. The WDM may have three ports, an incoming port connected to the operating fiber carrying the primary signal in the 1550 nm window, an incoming port attached to the pump laser operating at the 980 nm or 1480 nm, and an outgoing port connected to the operating fiber 212. At 308, the WDM 208 may combine an input signal light at 1550 nm with the pump signal in the 980 nm region. Bands in the 1550 nm region, e.g., in the 1525-1610 nm transmission window, can be amplified by EDFAs using pumping bands at 980 nm and 1480 nm. The 908 nm band has a higher absorption cross-section and may be useful where lower noise performance is required. The 1480 nm band has a lower, but broader, absorption cross section and may be preferred for higher power amplifiers. A combination of these bands may be used as well.

The relatively high-powered beam of light is mixed with the input signal using the wavelength selective coupler, WDM 208 and then, at 310, is propagated along the EDF 212, where signal amplification occurs. In embodiments, the optical amplifier 115 is an erbium doped fiber amplifier (EDFA), i.e., a doped fiber amplifier having a core of silica fiber 212 doped with erbium ions, which can be efficiently pumped with a laser and exhibit gain. Fiber link 212 represents the erbium doped fiber link. At 310 the combined signal is guided into the link of fiber 212 with erbium ions to their higher-energy state. When the photons belonging to the signal at a different wavelength from the pump light meet the excited erbium atoms, the erbium atoms give up some of their energy to the signal and return to their lower-energy state. A significant point is that the erbium gives up its energy in the form of additional photons which are exactly in the same phase and direction as the signal being amplified. So the signal is amplified along its direction of travel only. The fiber spool 212 which is typically a short link of fiber, e.g., having a length of 6-10 m, is small compared to the other fiber links in the EDFA, e.g., 10 km, 20 km, 30 km, etc. in length.

Thus, energy from the pump 210 is transferred to the signal as it travels through the optical fiber 212, combining the energy from the pump with the signal thereby amplifying the signal, e.g., by approximately 10-15 db. Amplification is achieved by the stimulated emission of photons from dopant ions in the doped fiber. For example, if 1 mw of light enters the WDM 208, the output of the WDM 208 signal may be 10 or 20 mw once amplified by the energy combined from the pump 210. The pump energy is therefore transferred to the optical signal and amplifies the signal via optical techniques, rather than the use of electronics.

From the fiber spool 212, the light enters another coupler 214 and photodiode 215 for keeping track of outgoing light. In a conventional EDFA, the light from fiber 212 or from photodiode 214 is input in to another isolator. In some instances, the isolator may be placed between the erbium fiber spool 212 and the photodiode 214. Isolators enable the optical signal to flow only in the forward direction, only allowing light to pass in a single direction and ensuring that lasing cannot take place with the EDF. Otherwise, such reflections can disrupt amplifier and, in the extreme case can cause the amplifier to become a laser. Thus, the second isolator is used to prevent the optical signal from being reflected from an output port and entering the EDF, thereby preventing reflections returning from the attached fiber via an optical coupler at port 220. Furthermore, the output isolator acts as a filter for any of the pump light propagating in the forward direction, thus stopping the pump laser light from exiting the amplifier output port.

The use of an EDFA is desirable as it is inexpensive and functions transparently as an optical amplifier. Accordingly, a common EDFA configuration is designed to be cost effective, reliable, and have low power consumption. In particular, conventional EDFAs make use of isolators because they are inexpensive, easy to use, and have traditionally been sufficient for facilitating amplification of the optical signal.

FIG. 2 depicts the use of a circulator 216 rather than terminating the light with an isolator. A circulator may include at least three ports. At 312, the circulator may be configured to receive the amplified optical signal at a first port of the circulator and output the optical signal from a second port of the circulator. As described below, at 314, the second port may receive reflected light from the EDFA output port 220 and redirect the feedback from an external source to the pump 210.

The circulator can receive input optical signals at any one of its ports and output the optical signal at the next port in the direction of rotation of the circulator. For example, a second port of the circulator may be the next port in the direction of rotation after the first port. The circulator is configured to receive a reflected optical signal at the second port of the first circulator from a fiber connected to the second port of the circulator when an input optical signal is received at the first port of the circulator. The circulator is configured to output the reflected optical signal at a third port of the circulator wherein the third port of the circulator is the next port in the direction of rotation of the circulator after the second port of the circulator.

Thus, instead of light reflections being prevented by an isolator, the circulator 216 circulates light, e.g., from port 1 to port 2, from port 2 to port 3. If light reflects back on to the fiber 112 from external stimuli at port 220, e.g., from fiber 112, the circulator 216 acts as an isolator by only allowing the reflected light to travel in one direction, but instead of an isolator that serves to terminate the reflected light, the circulator circulates the light from port 2 to port 3 back in to the photodiode 219. An isolator isolates the pump from access to any information about the optical link external to the EDFA, thereby serving as a barrier between the pump and any components/feedback external to the EDFA. In contrast, the disclosed EDFA is modified with a circulator to coordinate the optical functionality and electronic control functionality. The circulator 216 and electronic feedback enables the EDFA to interact with and self-adjust based on components/feedback external to the EDFA. Thus, while an isolator is useful for maintaining good performance at the EDFA level, the disclosed techniques implement a manner for interacting with stimuli external to the EDFA to optimize performance of the optical link, e.g., at a system level.

As shown in FIG. 2, the optical signal is received at port 1 of the circulator 216 and output from port 2 of the circulator 218. The optical signal output from port 2 is transmitted by the circulator on the fiber 112 at output 220. In contrast to an isolator which terminates the return of light, a portion of the light input to the fiber 112 is reflected back to port 2 of the circulator and enters port 2. The reflected light then will be circulated by the circulator 216 from port 2 to port 3 and output from port 3 of the circulator 216. The pump 210 receives the reflected light 218 via the photodiode 219. As depicted at 316 in FIG. 3, the pump can receive the feedback and adjust the gain of the amplifier by modifying an intensity of the pump laser. Thus, the pump signal provided to the combiner 208 at 306 is modified based on the feedback from the photodiode 219. The feedback loop continues until the EDFA is stabilized and the pump signal is not producing an excess of light, minimizing the reflection, or Brillouin backscatter, at the circulator.

It is noted that the EDFA may include a microprocessor 222 for directing the pump 210 to adjust the pump power based on the feedback 218. While the pump increases or decreases power based on the feedback from photodiode 219, the microprocessor 222 may be connected to any of the electronic elements shown in FIGS. 2, 4 and 5 for managing the adjustments based on the feedback. For example, the microprocessor 222 may monitor the gain of the EDFA, analyze feedback from the circulator and the photodiode 219, and increase or decrease pump power in response to the SBS. The dashed lines in the Figures represent electronic control feedback lines.

Above a certain threshold power of a light beam in a medium, stimulated Brillouin scattering can reflect most of the power of an incident beam. For example, consider a Brillouin threshold value of 7 dBm of light (5 mW of light), understanding that a different threshold value may apply based on fiber type and fiber length. When more than 5 mW of light is output at 220 on to a fiber 112 in a single laser exceeding an estimated 7 dBm Brillouin threshold, the fiber cannot manage the amount of light because the fiber is stimulated; the result is stimulated Brillouin scattering (SBS).

Referring to FIG. 2, assume in an example that the light output at 220 is below the SBS threshold and, thus, no reflected light is returned or coming back in to the EDFA 200. Photodiode 219 therefore is receiving a minimal amount of light, and not providing much feedback to pump 210 and, thus, pump 210 functions as normal.

Now assume that the EDFA is outputting in an excess of light in view of the SBS threshold, e.g., 13 dBm from the EDFA with an SBS threshold of 10 dBm. Now, all of that light is going to get back reflected and go back in to the circulator 216 at port 2. As disclosed, the circulator 216 may also include a photodiode 219. But the circulator 216 is able to function so that light will only circulate in the direction, e.g., from 1 to 2, and therefore the reflected light is circulated from port 2 to port 3 and out to photodiode 219. Thus, rather than terminating the light by an isolator, light may be provided by the circulator to photodiode 219 for light reflected back to port 2. The feedback of the reflected light is passed to the pump 210 via photodiode 219.

The pump 210 may modulate the feedback received to adjust the gain of the EDFA. For example, if photodiode 219 receives a large amount of light, the photodiode 219 sends a signal to the pump 210 that indicates that the pump is functional, but the fiber is not able to handle the amount of light amplified by the pump 210. The signal indicates to the pump 210 to adjust the pump to provide a smaller pump power to the WDM 208 for combining with the input signal. The pump will ratchet down, and then the gain will become proportionally less, which means less light going out in to fiber, less light reflecting back in to photodiode 219, and less going to pump 210. In other words, the feedback from photodiode 219 and the adjustments by pump 210 are made based on the characteristics of the section of fiber. The system self-adjusts based on the amount of feedback received from the circulator 216 and stabilizes itself. When the pump 210 is no longer receiving any or a significant amount of feedback 218 from the circulator 216, the pump has stabilized on a pump power functional for this link of fiber. Thus, the improvements are a function of the excess light for a unique section of fiber, and the pump wavelength varies with the light circulated to port 3 from the output port 220. The more light circulated to port 3, the more the pump 210 will ratchet down the pump laser. The system is therefore able to stabilize as a function of the particular length and type of fiber, without having explicit a priori knowledge of the particular length and type of fiber.

Feedback lines 217 and 218 facilitate the appropriation of the proper gain. If the light level was falling, the feedback lines inform the pump. If the light is supposed to come in at 10 dbm, but comes in at 12, the feedback lines inform the pump to ratchet down the pump wavelength. Thus, the output photodiode 219 informs the pump to limit the gain.

By adjusting the gain based on the self-identifying characteristics of the EDFA, the EDFA may set the gain to a level that works in accordance with an SBS threshold, without explicitly knowing the SBS threshold value. By reducing SBS, the system performance improves. The EDFA functions in contrast to conventional optical transmission systems that can only instruct the EDFA to function as an amplifier that experiences back reflections due to the lack of knowledge regarding the type and amount of light to input to the optical amplifier. For example, in conventional systems, photodiode 215 only knows what is occurring within the EDFA and the EDFA is isolated. The disclosed techniques enable the EDFA to test the output, giving feedback to what the outside environment is doing, and inject external outputs back in to EDFA to modify functionality of pump 210.

The disclosed techniques are applicable for any Brillouin threshold value whether known or unknown, regardless of the value, and do not require an estimated threshold value. Thus, while the Brillouin threshold, for dictating an amount of light to launch into an optical fiber, is conventionally required to be estimated due to a lack of a priori knowledge of the length and type of fiber, the disclosed techniques apply without requiring the use of a typically overly conservative estimate of the threshold value. As disclosed, each link of fiber in the optical communications system can adjust for the SBS limit on a link by link basis, such that the right amount of light can be launched in to the respective length/link of fiber. The disclosed techniques accommodate a Brillouin threshold value that may vary from fiber to fiber, such as based on the length and type of fiber in the subject fiber link. For example, for a 10 km long optical fiber, the Brillouin threshold may be 10 dBm; for a 20 km length of fiber, the Brillouin threshold may be 9 dBm. The system stabilizes itself for any length or type of fiber, accommodating further for other variations in the Brillouin threshold, such as variations due to broadband phase modulation, dithering, initial pulse modulation, etc.

The disclosed techniques may address deficiencies in prior technologies, including optimizing performance of the optical link by enhancing signal to noise ratio on the optical link and minimizing distortions compared to the performance of optical links relying on incorrect link information. For example, many optical systems rely on stored database information to provide the estimate of a length of an optical fiber/link. But lengths stored for many of the links do not compensate for slack in the installed optical fiber (i.e., the length is based on a physical distance between a start point and an end point, but does not include the actual length of optical fiber installed that may vary due to slack in the fiber as installed). Measuring the optical links manually usually requires that the fiber be disconnected for a period of time, causing an interruption to the system.

Further, not only are the initial lengths stored for many of the links incorrect, but information is not always updated when additional fiber links are installed, repaired, or otherwise modified. Thus, additional optical fiber may be installed to a link, but legacy data is not updated to accommodate for the installation. Thus, estimates regarding fiber length and type may have many errors that are not intrinsically adjusted for in the system.

The disclosed gain adjustments can be made automatic, such that any network can deploy the techniques to cause an automatic scan of SBS to set the correct amount of light. The techniques can adjust the optical amplifier gain for any variable length of fiber, regardless of the length of the subject fiber. In other words, the transmitter can be removed from one network and be placed in to a second network, and the transmitter will self-adjust to accommodate the parameters of the second network. Further, installation time may be significantly reduced because such a self-correcting system can be installed without requiring installers at both ends of the optical link for measuring length.

FIG. 4 depicts a variation of the EDFA implementation shown in FIG. 2. The EDFA 400 is integrated with a transmitter 402 that outputs light, such as an externally modulated transmitter, a directly modulated, or an electro absorption externally modulated transmitter. The RF input at 401 is converted to optics at the transmitter 402 and then input in to the EDFA components, which includes circulator 216. If the EDFA output at port 2 of the circulator 216 is higher than the SBS threshold, reflected light circulates from port 2 to 3 to photodiode 219 and then fed back to pump 210. Pump 210 reduces the pump laser in accordance with the feedback from photodiode 219. In the integrated transmitter/EDFA 400, the detected reflected power is converted to a voltage that controls the optical gain in the EDFA, thereby reducing SBS.

The voltage can also be fed back at 424 and used to control the SBS circuitry 426 in the transmitter 402. The SBS circuit 426 samples the light of the signal. The SBS circuit 426 can also give a feedback to the EDFA to increase SBS or decrease the SBS limit on the transmitter as appropriate. In embodiments, the less SBS circuitry needed is more efficient. Providing a native SBS suppression can be configured to provide a desired amount of suppression. Too much suppression may not be desirable because it changes the optical spectrum of light causing additional impact from fiber dispersion and increasing optical non-linearities, such as Four Wave Mixing in multi-wavelength systems.

Figure 5:
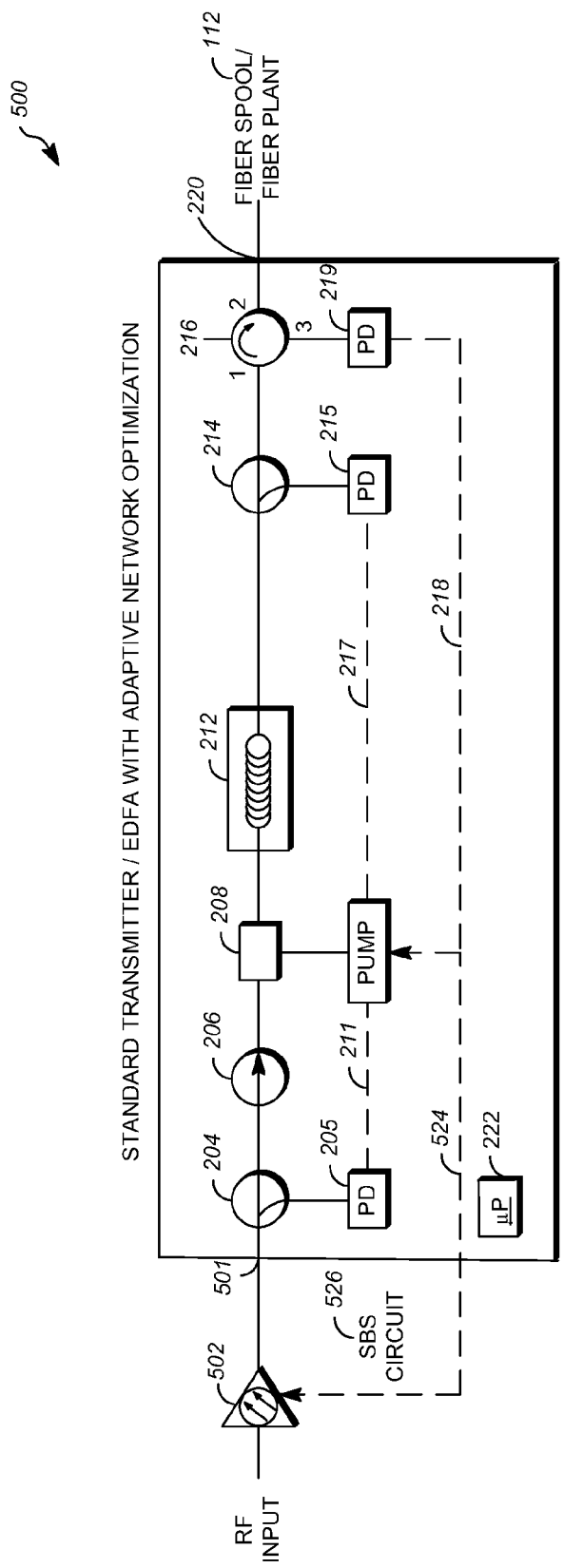
FIG. 5 depicts another embodiment of the EDFA depicted in FIG. 2.

FIG. 5 depicts another embodiment of the EDFA implementations disclosed herein. The adaptive transmitter 502 in FIG. 5 is shown independent of the EDFA, where the component may be designed as a component separate from the EDFA. In FIG. 5, the EDFA with adaptive network optimization techniques is shown connected to a standalone transmitter 502. As described above, the transmitter 502 converts RF input to light that is input to the EDFA. In this implementation, the EDFA external to the SBS circuitry 526 can provide signaling to the SBS circuitry.

FIGS. 4 and 5 depict manners for allowing the transmitter 402 or 502 to increase SBS suppression but also allow feedback from the circulator 216 to assist. Depending on whether the pump 210 pumps more or less signal, SBS suppression for optical transmitters is known. FIG. 5 introduces an input to the SBS circuitry that is in response to outside stimuli. Transmitter 402 is integrated with the EDFA and transmitter 502 is standalone from the EDFA. The embodiments depict examples for setting up the EDFA for giving feedback to SBS circuitry 426 or 526, whether the EDFA is integrated with the transmitter or is standalone.

The disclosed techniques facilitate EDFA stabilization, understanding that it is unreasonable that a priori knowledge regarding the characteristics of the fiber or the components described is available. For example, an accounting for a length of fiber is really an accounting for an approximated length of fiber. Thus, the disclosed techniques provide methods for customers that also do not have a priori knowledge of the fiber links in their optical communications system. The disclosed techniques are able to fine tune estimates made for the optical communication system. A display device may connect to the detector and is configured to receive the direct current (D.C.) voltage from the detector and display the optical power of the reflected optical signal. For example, information gathered from devices can be used by CORView to provide a system map detailing SBS optimization. (CORView SBS Map™).

In one or more examples, the functions described herein may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, and DSL are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In an embodiment, a computer-readable storage medium has stored thereon instructions that, when executed, cause a processor to receive an input optical signal, generate a pump laser, combine the input signal with the pump laser for amplifying the input optical signal, receive the amplified optical signal at a first port of a circulator, and output the optical signal to a second port of the circulator. The circulator redirects feedback from an external source to adjust the gain of the amplifier by modifying an intensity of the pump laser.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

We claim:

1. An optical amplifier for self-adjusting its gain, the optical amplifier comprising:
    an input port that receives an input optical signal;
    a pump that generates a pump signal;
    a combiner that combines the input optical signal with the pump signal for amplifying the input optical signal; and
    a circulator comprising at least three ports, wherein the circulator is configured to receive the amplified optical signal at a first port of the circulator and output the amplified optical signal at a second port of the circulator,
    wherein the circulator redirects feedback reflected back to the second port from an external source to a third port for receipt by the pump,
    wherein the pump receives the feedback and accordingly modifies an intensity of the pump signal to be combined with the input optical signal to adjust the gain of the optical amplifier.

2. The optical amplifier of claim 1, further comprising an isolator for propagating optical signals in a forward direction.

3. The optical amplifier of claim 1, responsive to the amplified signal output from the second port of the circulator, injecting external outputs from the external source back in to the optical amplifier via the third port of the circulator to modify functionality of the pump.

4. The optical amplifier of claim 1, wherein the combiner is a wave-division multiplexer.

5. The optical amplifier of claim 1, wherein the second port of the circulator is a next port in a direction of rotation after the first port, and wherein the circulator is configured to receive a reflected optical signal at the second port of the circulator from a fiber connected to the second port of the circulator, the circulator is configured to output the reflected optical signal at a third port of the circulator wherein the third port of the circulator is the next port in the direction of rotation of the circulator after the second port of the circulator.

6. The optical amplifier of claim 1, further comprising an optical detector connected to a third port of the circulator, the optical detector configured to provide feedback to the pump in response to the reflected optical signal redirected to the third port of the circulator.

7. The optical amplifier of claim 6, wherein the optical detector is a photodiode.

8. The optical amplifier of claim 1, wherein the pump adjusts a power of the pump signal for combining with the input optical signal, thereby adjusting the gain of the optical amplifier.

9. The optical amplifier of claim 1, wherein an optical detector is configured to convert a reflected optical signal to a direct current (D.C.) voltage.

10. The optical amplifier of claim 1, further comprising a display device connected to a detector and configured to receive a direct current (D.C.) voltage from the detector and display an optical power of a reflected optical signal.

11. The optical amplifier of claim 1, wherein a section of optical fiber amplifies the combined signal by a stimulated emission.

12. The optical amplifier of claim 1, further comprising an output port for outputting the amplified optical signal amplified by an optical fiber.

13. A method for self-adjusting an amplifier gain in an optical amplifier, the method comprising:
    receiving an input optical signal;
    generating a pump signal;
    combining the input optical signal with the pump signal for amplifying the input optical signal by propagating the combined signal through a section of optical fiber;
    receiving the amplified optical signal at a first port of a circulator; and
    outputting the amplified optical signal at a second port of the circulator,
    wherein the circulator redirects feedback received from an external source in response to the outputted amplified optical signal, and modifies an intensity of the pump signal to adjust the amplifier gain of the optical amplifier.

14. The method of claim 13, further comprising propagating optical signals in a forward direction.

15. The method of claim 13, further comprising, responsive to the amplified signal output from the second port of the circulator, injecting external outputs from the external source back in to the optical amplifier via a third port of the circulator to modify functionality of the pump.

16. The method of claim 13, wherein the second port of the circulator is a next port in a direction of rotation after the first port, and wherein the circulator is configured to receive a reflected optical signal at the second port of the circulator from a fiber connected to the second port of the circulator, the circulator is configured to output the reflected optical signal at a third port of the circulator wherein the third port of the circulator is the next port in the direction of rotation of the circulator after the second port of the circulator.

17. The method of claim 13, transmitting feedback in response to the reflected optical signal received at the third port of the circulator to a pump that generates the pump signal.

18. The method of claim 17, responsive to the feedback, adjusting a power of the pump signal for combining with the input optical signal to adjust the amplifier gain of the optical amplifier.

19. The method of claim 13, further comprising converting a reflected optical signal to a direct current (D.C.) voltage and displaying an optical power of the reflected optical signal.

20. The method of claim 13, wherein the combined optical signal is amplified by a stimulated emission when propagated through the section of optical fiber.

* * * * *